United States Patent [19]
Guion et al.

[11] 3,824,596
[45] July 16, 1974

[54] AUTOMATIC SECTOR INDICATING DIRECTION FINDER SYSTEM

[75] Inventors: William G. Guion; Terence C. Green, both of San Antonio, Tex.

[73] Assignee: Southwest Research Institute, San Antonio, Tex.

[22] Filed: Sept. 27, 1972

[21] Appl. No.: 292,533

[52] U.S. Cl........ 343/113 R, 343/100 PE, 343/119, 343/120, 343/800
[51] Int. Cl............................................. G01s 5/02
[58] Field of Search.. 343/113 R, 119, 120, 100 PE, 343/796, 799, 800

[56] References Cited
UNITED STATES PATENTS

| | | | |
|---|---|---|---|
| 3,329,954 | 7/1967 | Travers | 343/113 R |
| 3,490,024 | 1/1970 | Sherrill et al. | 343/113 R |
| 3,670,332 | 6/1972 | Blommendaal | 343/113 R |
| 3,710,332 | 1/1973 | Tischner et al. | 343/113 R |
| 3,727,227 | 4/1973 | Takao et al. | 343/113 R |
| 3,728,730 | 4/1973 | Takao et al. | 343/113 R |

*Primary Examiner*—Richard A. Farley
*Assistant Examiner*—S. C. Buczinski
*Attorney, Agent, or Firm*—Donald Gunn

[57] ABSTRACT

An automatic sector indicating direction finder system which incorporates a receiving antenna arrangement incorporating four separate antenna patterns, each having a field pattern which is a function of the azimuth angle, the apparatus forming antenna signals which are then transferred through a plurality of antenna sequencing relays to a dual channel receiver. The dual channel receiver is connected to the four antennae in a timed sequence. The two outputs of the dual channel receiver are applied to phase detectors and amplitude detectors which determine the relative amplitude ratios. These ratios and the phase measurements are stored in memory momentarily and are then strobed from memory through a hard wired decoding logic circuit to an external display. The display breaks the 360° of azimuth into sixteen sectors, all equal in size, and indicates the sector location of a target.

20 Claims, 6 Drawing Figures

PATENTED JUL 16 1974　　3,824,596

$|E_1| \propto \sin 2\phi$　　$|E_2| \propto \cos 2\phi$　　$|jE_3| \propto \sin \phi$　　$|jE_4| \propto \cos \phi$

AUTOMATIC SECTOR INDICATING DIRECTION FINDER SYSTEM

BACKGROUND OF THE INVENTION

In the vicinity of airports with substantial traffic, it is necessary to determine the bearing of aircraft. Numerous devices, including rotating search radar systems, have been used in the past by air traffic controllers to determine the bearing of aircraft in the near vicinity. Such systems have met with some degree of success, dependent on the problems of the installation.

One significant problem is the possibility of ambiguities in the interpretation of data. Ambiguities in a system which presents a visual image more readily occur depending on ground scatter, nearby high rise obstacles such as smoke stacks, other antennas, fixed ground devices, atmospheric conditions, weather, and so on. Normally, a direction finding system presents a visual image of the near vicinity of an airport and requires the operator to interpret the objects which are seen on the screen. The operator must keep a sharp eye on the screen, and must recall the location of an object seen on the screen to determine if it has moved. Air traffic controllers encounter substantial problems in this regard, particularly when fatigued. The human factor becomes quite material in the interpretation of visually presented data of this sort.

Many small air fields have a minimum of air traffic and equipment. The air traffic controller may route as few as two or three airplanes per hour. Often small airports provide service to small aircraft having a minimum of electronic equipment. The present invention is particularly applicable for an airport frequented by aircraft having a minimum of electronic equipment. It is responsive to signals transmitted from the aircraft, such as voice transmission as might occur when a pilot requests clearance or landing instructions.

The present invention is a device passively responsive to a transmission from an aircraft. It does not require addition of any active equipment to the aircraft. It does not incorporate any active ground equipment such as a transmitter. It involves only passive ground equipment, a receiving antenna system.

One significant aspect of the present invention is its ability to be installed in less than optimum circumstances. The present invention incorporates antennas having receiving patterns of dipole and quadrapole configuration. In ideal siting locations, the antenna response patterns will closely conform to the ideal. When the siting is less than ideal, problems may arise on re-radiation from nearby buildings, smoke stacks, and the like. Other antennas are often clustered around an airport facility transmitting on various frequencies, sometimes with substantial power. Antenna masts may be positioned a few feet from the site of the antenna of the present invention. All of these factors combine to create siting problems.

The present invention incorporates means which accommodates distortion of the antenna patterns due to poor siting. It indicates sector location of an aircraft in spite of antenna pattern deviation over a wide range. As a consequence, it may be installed at locations which would not otherwise be available. It can be relegated to less desirable installation points while other antenna of a more critical nature can have the preferred location.

Many other problems and difficulties regarding direction finding indicator systems exist. The present invention is intended as an apparatus which meets and solves these problems. It differs in the first aspect by providing an output signal which is digitally represented. The present invention does not require and does not utilize a target indicator system which requires visual inspection of a cathode ray tube. It indicates the presence or location of a target aircraft by indicating its position relative to a group of arbitrarily defined azimuth segments. In the preferred embodiment, the segments are divided into 22½° so that there are 16 equal segments. This is normally precise enough to enable an air traffic controller to make decisions readily based on the information obtained. With the use of the present invention as supplemental equipment to the pre-existing indicators, the air traffic controller is able to route and control target aircraft with greater facility. The apparatus of the present invention forms a signal or indication with less chance of ambiguity or error in reading and interpretation.

The direction finding system is particularly economical compared with competitive devices. It does not require use of a transmitter aboard the aircraft transmitting on an assigned frequency with a specified format. Such pre-existing direction finding systems normally require a transmission of several seconds duration while the present invention requires transmission for only a few milliseconds. It can be made to respond even faster. It does not require allocation of a frequency range or spectrum, but rather can respond to the installed voice transmission system.

SUMMARY OF THE INVENTION

The present invention is summarized as incorporating a quadrapole and dipole antenna system in which four specific antenna patterns are utilized to determine the location of a particular target. The signals obtained from the antenna system are then analyzed by being passed through a dual channel receiver apparatus which selectively switches between the four antennas. The output of the dual channel receiver is fed to a comparator device. Both phase and amplitude comparisons are made between selected signals. The phase and amplitude comparisons are supplied to a memory circuit which temporarily holds the comparison data. Periodically the memory circuit is interrogatated and data is strobed therefrom through a hard wired logic circuit which analyzes the data, thereby eliminiting ambiguities, and forming an output which is digitally represented and interpreted.

DESCRIPTION OF THE PREFERRED EMBODIMENT

Figure 1:
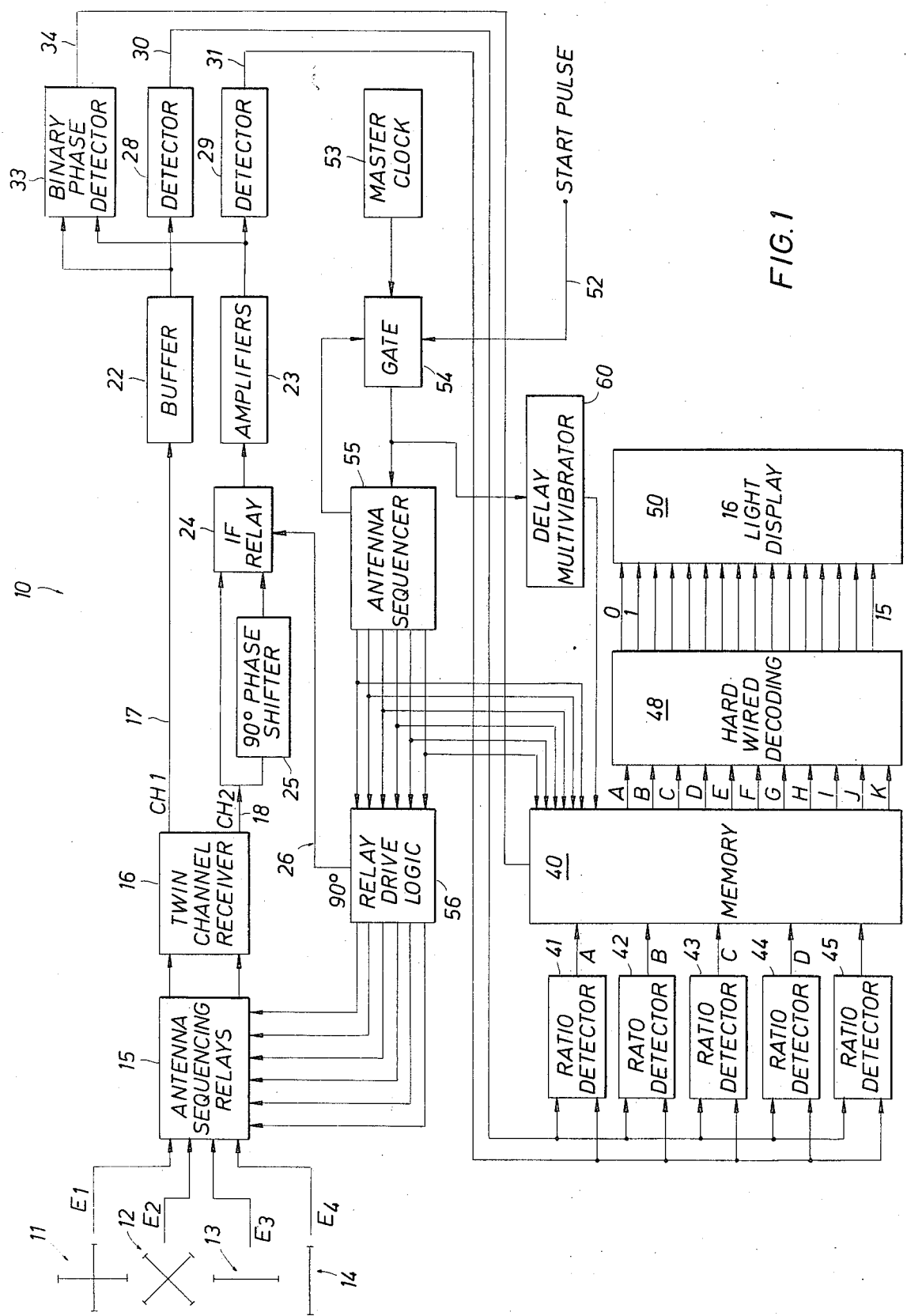
FIG. 1 is a schematic block diagram of the automatic sector direction finding system of the present invention.

In the drawings, attention is first directed to FIG. 1 where the numeral 10 identifies the automatic sector indicating direction finder system of the present invention. The various components are represented in schematic block form. Four antennas 11, 12, 13, and 14 are incorporated which will be described in detail hereinafter. The antennas form foru output signals which are represented by the vectors $E_1$, $E_2$, $E_3$, and $E_4$. The four antenna output signals are provided to antenna sequencing relays 15. These relays select two of the four output signals which are provided to a pair of identical receivers 16. The two receivers 16 form output signals on first and second channels 17 and 18. The signals on the channels 17 and 18 are supplied to phase and amplitude comparator circuits. These circuits are utilized as will be described hereinafter.

Figure 5:
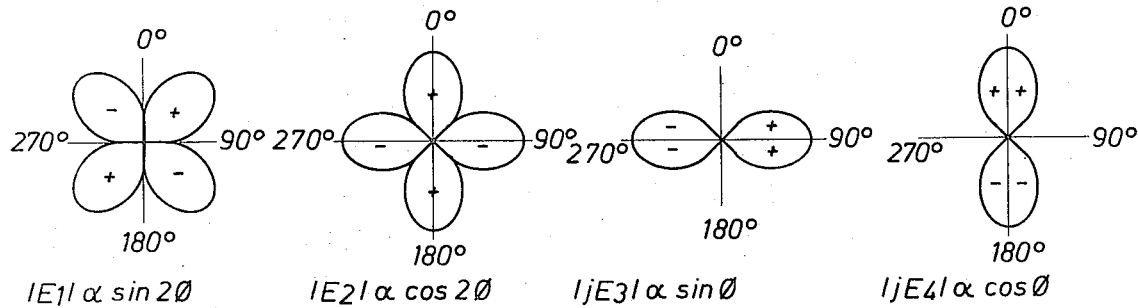
FIG. 5 shows theoretical antenna patterns and the relative phase and amplitude for each antenna; and, FIG. 6 shows the relative phase for all the antennas collectively.

Considering some of the RF components in greater detail, the antennas 11, 12, 13, and 14 form four independent antenna patterns which are shown in FIG. 5. They are illustrated having a theoretical shape. The actual antenna patterns may be somewhat distorted due to antenna siting problems. Small or moderate distortions of antenna patterns do not alter the output signal of the direction finding system of the present invention.

Figure 2:
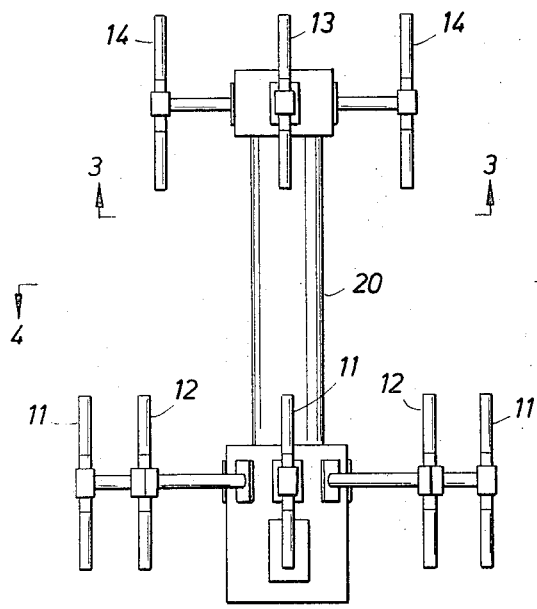
FIG. 2 is a side view of one form of antenna system suitable for use with the present invention.
Figure 3:
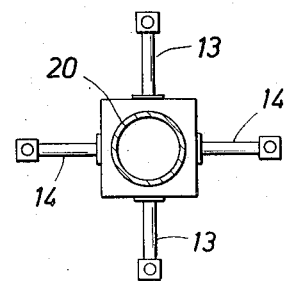
FIG. 3 is a sectional view taken along the line 3 — 3 of FIG. 2 illustrating details of construction of one portion of the antenna system.
Figure 4:
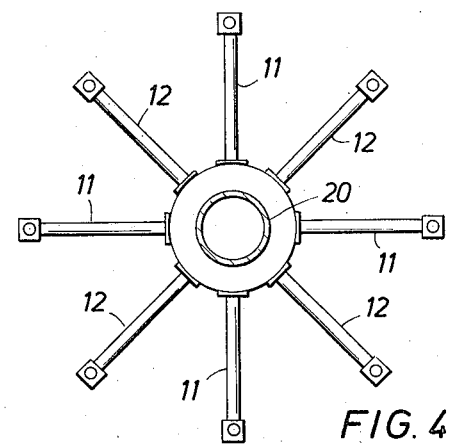
FIG. 4 is a sectional view taken along the line 4 — 4 of FIG. 2 illustrating additional details of arrangement of another portion of the antenna system.

Attention is directed to FIG. 2 which illustrates one form of antenna suitable for use with the direction finding system of the present invention. An arrangement utilizing both dipole and quadrupole antennas is illustrated. An antenna mast 20 supports two separate groups of antennae. As better illustrated in FIGS. 3 and 4, the dipole antennae 13 and 14 and the quadrapole antennae 11 and 12 are supported on the common mast 20. The size, dimensions, and sensitivity for the dipoles 13 and 14 and the quadrapoles 11 and 12 are subject to variation dependent on the frequency, and design requirements of the installation of the antenna system. The antennae 11, 12, 13, and 14 are arranged to receive signals in patterns of the sort illustrated in FIG. 5. Many factors relating to the direction finder system have been omitted, such as the frequency, range, and gain for the several antennae and the various system components, including rf cabling, couplings, tees, and other components associated with the rf handling system. The present invention cooperates with any sort of hf, vhf, or uhf airborne transmitter.

Returning to FIG. 1, the two receivers 16 form signals on the conductors 17 and 18. The first channel is supplied over the conductor 17 to a buffer amplifier 22. A similar buffer amplifier 23 is also provided. The second output signal on the conductor 18 is supplied directly to an IF relay 24. The signal is applied through a 90° phase shifting network 25. The unshifted signal and the shifted signal are both supplied to the relay 24 which is operated at selected intervals by means of a signal on a conductor 26. More will be noted concerning this signal hereinafter.

The buffer amplifiers 22 and 23 deliver the amplified signals to a pair of amplitude detector circuits 28 and 29. The amplitude detectors 28 and 29 are envelope detectors. They form output signals on conductors 30 and 31.

The buffer amplifiers 22 and 23 are also connected at their outputs to a phase detector 33. The phase detector 33 detects the relative phase between the two signals. It determines whether the two signals are more nearly in phase or out of phase. The output is formed on a conductor 34. The phase detector 33 determines the relative phase of the signals received from two of the four antennae selected by the antennae sequencing relays 15. More will be noted concerning the sequencing hereinafter. On reference to FIG. 5, it will be noted that the antenna patterns are differently arranged from one another, and possess differences in phase relationship. The apparatus of the present invention utilizes this difference in phase relationship which is detected by the means 33 to extract data as to the position of the target aircraft. The amplitude detectors 28 and 29, in cooperation with the phase detector 33, form signals on the conductors 30, 31 and 34, respectively, which are interpretated as will be described hereinafter.

A memory circuit 40 holds or stores information input for a short period of time. One portion of this information is the phase data supplied on the conductor 34 which is input to the memory device 40. Additional information is derived from a group of ratio detectors 41, 42, 43, 44, and 45. The five ratio detectors are all similar in construction and are all provided with the envelope detected signals from the amplitude detectors 28 and 29. The five ratio detectors compare these signals and form a binary one output when a ratio is exceeded and a binary zero output when the ratio is not exceeded. The specifics of the comparison will be set forth hereinafter. The ratio detectors form digital signals which are then input to the memory device 40 and stored.

The memory device 40 is connected to a decoding circuit 48. The decoding circuit 48 receives certain data from the memory device 40. In response to the data in the memory circuit, output signals are formed for a 16 state display 50. The display 50 forms a signal indicating that a target is in a specific azimuthal sector having a width of 22½°.

A conductor 52 supplies a start pulse. A clock 53 forms a procession of pulses supplied to a gate 54 which is connected to an antenna sequencer 55. The antenna sequencer 55 is a register which cycles through a number of states, to be described. The antenna sequencer 55 is connected to a relay drive circuit 56 which is connected to the antenna relays 15. The antenna sequencer circuit counts through six states and forms signal levels on one of six conductors supplied to the relay drive circuit 56. This circuit converts the six signals into six drive signals for operation of the antenna relay as will be described.

The gate 54 also provides a signal for a delay multivibrator 60. The delay multivibrator 60 forms a strobe pulse which times and gates the admission of data to the memory device 40. It should be kept in mind that the phase detector 33 functions continuously and always provides a comparison. However, the various comparisons must be allowed time to settle. There are also switching transients which occur upon switching of the antenna relays 15. These transients are reflected through all of the circuitry connected from the four antennae through the two channel receivers 16. The timing of the pulse from the multivibrator 60 avoids transfer of a reading until the signals have settled.

The delay multivibrator 60 also controls the timing of the transfer of data from the ratio detectors 41 – 45, inclusive, into the memory device 40. The ratio detectors must be allowed a sufficient interval to let their output signals settle. The ratio detectors function individually at different intervals. They do not function simultaneously.

Table I identifies the desired comparisons which are used in the direction finding system of the present invention. At the left edge, Table I incorporates a list of the comparisons which are made. Five comparisons are of the absolute values of the respective amplitudes. These are denoted by the symbols A, B, C, D, and K. The comparisons E – J, inclusive, are of the phase of selected signals. The value of these comparisons is indicated in a binary system. The right side of Table I identifies the test to be satisfied to form a binary one. The binary value of one is, of course, stored in the memory device 40. The memory device is adapted to receive and store a binary indication of zero.

The circle of 360° about the direction finding apparatus of the present invention is divided into 16 segments. The 16 segments are numbered sequentially about the circle. Various tests are applied to the incoming signals to locate the target in one of the segments. For instance, the left column identifying the first sector with the reference zero tabulates values for the measurements A – K, respectively. Several measurements have values, while the measurements E, F, G, I, and J all are indeterminate. The measurements A, B, C, D, H, and K provide values which can be utilized by digital circuitry to determine whether or not a target is in the zero sector where the determination is made without ambiguity.

The Boolean algebraic representation of the unique and unambiguous representation of the sector location of the target aircraft is tabulated next in Table II. A different equation is given for each of the 16 sectors. The equations take advantage of selected available data. Not all of the available data is used. In some sectors, it will be observed that certain values of the comparisons represented by the symbols A – K, inclusive, are uncertain or changeable. This data is not used. For example, FIG. 5 shows all values in sector one as positive non-zero measurements. However, sector four shows two of the antenna outputs passing through zero and changing value. Suppose that the location of the antennae is less than ideal. In that event, some distortion of the antennae pattern may occur. The present invention accommodates such imperfections.

Figure 6:
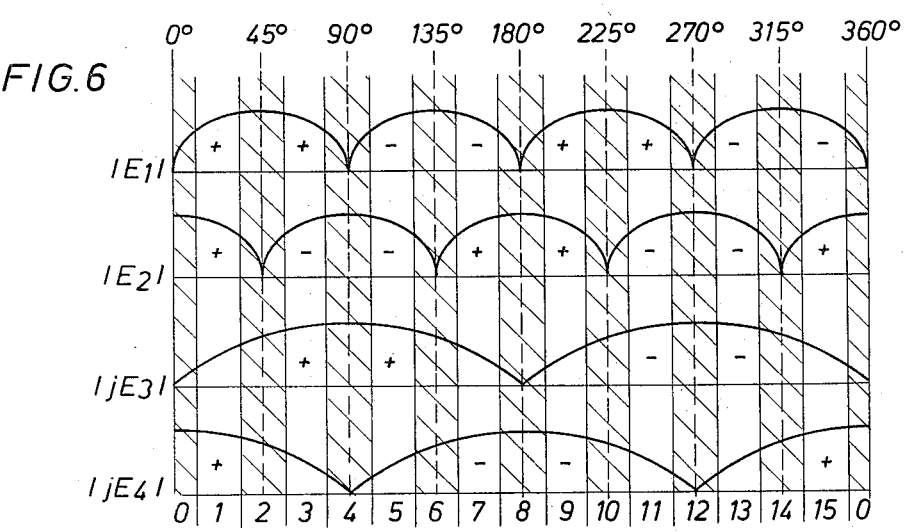

Certain values are not indicated in Table I. The Boolean algebraic equations set out in Table II identify the selected comparison chosen to obtain a sector identification which is unambiguous. For example, the expressions which identify sectors two, four, six, and so on, are a function of three variables. These variables can be observed in FIG. 5 as less susceptible to antenna pattern distortion. Sectors one, three, five and so on, are identified by either of two functions. Referring to FIG. 5, it will be observed that even more drift or distortion in antenna pattern can be tolerated. The nulls are ideally located at the centers of the nulls as shown in FIG. 6. A shift of one-half a sector width, 11.25°, will relocate a null shift into an adjacent sector. This deviation or distortion can be tolerated without creating an error in the indicated sector. Table I shows certain comparisons represented as 0/1, 1/-, and so on. The logic level to the left represents that measurement made for an ideal antenna pattern such as that shown in FIG. 5. For a less than ideal location, movement of a null into an adjacent sector from the ideal causes the comparison to form the logic state to the right of the slash mark.

An examination of Table I and Table II shows that the present invention is readily able to indicate sector location of an aircraft in spite of antenna pattern distortion. The Boolean expressions are in the alternative such that the second or right hand expression listed in Table II is not required if the antenna pattern is nearly perfect. However, in the event of antenna pattern distortion, the right hand expression forms the appropriate output while the left hand expression may drop out.

The decoding circuit 48 is wired to make the binary determinations required for each of the 16 sectors. The presence of a target in the first sector is indicated by formation of a signal through a gating circuit which accomplishes the Boolean function required for that sector. The other sectors have uniquely wired gating circuits which accomplish the Boolean algebraic functions set forth in Table II. Each is connected to an output indicator in the indicator device 50. There is one indicator for each of the 16 segments. If desired, the 16 segments can be indicated as a four bit word for easy transfer to a remote device.

Table III identifies the sequencing of the antenna relays 15. It will be noted that the antennas are stepped through a sequence which has six steps. The antenna relays 15 provide timed signals to the two receivers 16. The sequence of antenna signals delivered through the relays 15 to the receivers 16 is shown. The amplitude or phase measurements which are formed in accordance with the six step sequence are also shown. The sequence of six is repeated for each of the readings taken by the device. All of the measurements shown in the right side of Table III must be completed for each target indication provided by the device.

The typical accuracy of the direction finding system of the present invention has been demonstrated under poor siting conditions to provide correct sector indication for most aircraft intercepts. The twin channel receivers need only match one another to ± 1 dB, and ± 5° in phase for acceptable performance.

The signal from the phase shifter 25 is controlled by the relay 24. A signal is provided on the conductor 26 as previously noted. This phase shifted signal is provided whenever a dipole mode and a quadrapole mode function are compared for a given measurement, one of the six states shown in Table III. In this event, the relay drive logic introduces a 90° phase shift into the dipole mode signal. The 90° phase shift compensates for the 90° phase difference inherent between quadrapole and dipole mode antennas. The signals are in phase if they are within ± 89° of one another. Hence, a binary one is formed. Otherwise, a binary zero is formed.

The apparatus of the present invention can be used without confusion in the event several aircraft are in the vicinity. Suppose the aircraft are all equipped for transmission of voice to a control tower. The air traffic controller in the tower normally converses with one aircraft at a time. As he listens, he can actuate the present invention for one cycle of operation which is accomplished in a fraction of a second. The sector is indicated and held until its next operation. The next operation can be triggered by the operator during the next conversation and another indication obtained. The process can be repeated during each conversation.

In the alternative, the apparatus is responsive to CW, or PCM radio frequency transmissions from the target. Other short bursts or emissions can be used.

One alteration which can be incorporated in the apparatus is a four channel receiver. This eliminates the need to switch the four antennae between the two channels in the receiver.

Many alterations and variations in the apparatus can be incorporated without departing from the scope of the present invention, which is determined by the claims which are appended hereto.

TABLE I

| COMPARISON INVOLVED | NAME | SECTOR | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| $\|E_1\|$ to $\|E_2\|$ | A | 0 | 0 | 1 | 0 | 0 | 0 | 1 | 0 | 0 | 0 | 1 | 0 | 0 | 0 | 1 | 0 |
| $\|E_1\|$ to $\|E_2\|$ | B | 1 | 0 | 0 | 0 | 1 | 0 | 0 | 0 | 1 | 0 | 0 | 0 | 1 | 0 | 0 | 0 |
| $\|E_3\|$ to $\|E_4\|$ | C | 0 | 0 | 0 | 0/1 | 1 | 0/1 | 0 | 0 | 0 | 0 | 0 | 0 | 1 | 0 | 0 | 0 |
| $\|E_3\|$ to $\|E_4\|$ | D | 1 | 0/1 | 0 | 0 | 0 | 0 | 0 | 0/1 | 1 | 0/1 | 0 | 0/1 | 1 | 0/1 | 0 | 0 |
| Phase $E_1$ to $E_2$ | E | — | 1 | — | 0 | — | 1 | — | 0 | — | 1 | — | 0 | — | 1 | — | 0/1 |
| Phase $E_1$ to $jE_3$ | F | — | 1/— | 1 | 1 | — | 0 | 0 | 0/— | — | 0/— | — | 0 | — | 1 | — | 0 |
| Phase $E_2$ to $jE_3$ | G | — | 1/— | — | 0 | 0 | 0 | — | 1/— | — | 0/— | — | 1 | 1 | 1 | 1 | 1/— |
| Phase $E_2$ to $jE_4$ | H | — | 1 | 1 | 0/— | — | 1/— | — | 0 | 0 | 0 | — | 1/— | — | 0/— | — | 0/— |
| Phase $E_3$ to $E_4$ | I | — | 1/— | 1 | 1/— | — | 0/— | 0 | 0/— | — | 1/— | 0 | 1/— | — | 0/— | 0 | 1 |
| Phase $E_1$ to $jE_4$ | J | — | 1 | 1 | 1/— | — | 1/— | 1 | 1 | — | 0 | 0 | 0/— | — | 0/— | 0 | 0/— |
| $\|E_3\|$ to $\|E_4\|$ | K | 1 | 1/0 | — | 0/1 | 0 | 0/1 | — | 1/0 | 1 | 1/0 | — | 0/1 | 0 | 0/1 | — | 1/0 |

( — = Value Uncertain)

TABLE II

```
 0 = B K H
 1 = Ā B C̄ D̄ E F I + Ā B D H J
 2 = A F J
 3 = Ā B C̄ D̄ E F I + Ā B C F Ḡ
 4 = B K Ḡ
 5 = Ā B C̄ D̄ E F̄ I + Ā B C F̄ Ḡ
 6 = A F̄ J
 7 = Ā B C̄ D̄ E F̄ I + Ā B D H̄ J
 8 = B K H̄
 9 = Ā B C̄ D̄ E F I + Ā B D H̄ J̄
10 = A F̄ J̄
11 = Ā B C̄ D̄ E F̄ I + Ā B C F G
12 = B K̄ G
13 = Ā B C̄ D̄ E F̄ I + Ā B C F G
14 = A F J̄
15 = Ā B C̄ D̄ E F I  Ā B D H J
```

TABLE III

| ANTENNA SEQUENCE NO. | RECEIVER INPUT | | AMPLITUDE AND/OR PHASE MEASUREMENT TO BE MADE |
|---|---|---|---|
| | CH 1 | CH 2 | |
| 1 | $E_1$ | $E_2$ | A, B, E |
| 2 | $E_1$ | $E_3$ | F |
| 3 | $E_2$ | $E_3$ | G |
| 4 | $E_2$ | $E_4$ | H |
| 5 | $E_3$ | $E_4$ | C, D, I, K |
| 6 | $E_1$ | $E_4$ | J |

We claim:

1. An apparatus for determining the sector location of a target comprising:

antenna means for providing quadrupole and dipole mode field patterns for determining the azimuth of a target where the patterns are a function of sin $2\phi$, cos $2\phi$, sin $\phi$, and cos $\phi$, and $\phi$ is the azimuth angle;

receiver means connected to said antenna means for forming output signals from emissions independent of frequency in a specified range received from such a target, said output signals including received signal magnitude and phase information;

digital comparator means connected to said receiver means for determining relative comparisons of selected magnitude and phase information of signals therefrom and forming digitally encoded representations thereof; and, means connected to said digital comparator means and provided with the output representations thereof for determining from the digitally encoded representations a sector location of the target in azimuth where the sector is of predetermined angular width.

2. The apparatus of claim 1 including in said antenna means
   a. a first quadrupole mode antenna;
   b. a second quadrupole mode antenna oriented 45° in azimuth from said first antenna;
   c. a first dipole mode antenna oriented 0° in azimuth from said first quadrapole mode antenna; and,
   d. a second dipole mode antenna oriented 90° in azimuth from said first dipole mode antenna.

3. The apparatus of claim 2 including means for sequentially operating said antennas to provide signals to said receiver means in a sequenced pattern.

4. The apparatus of claim 3 wherein the operating means includes first and second similar means for sequentially enabling said antennas in the following pattern:

| Step | | |
|---|---|---|
| 1 | a | b |
| 2 | a | c |
| 3 | a | d |
| 4 | b | c |
| 5 | b | d |
| 6 | c | d | where the steps are non-ordered, and the letters refer to the antennae of claim 2.

5. The circuit of claim 2 wherein said antenna means forms two signals $E_1$ and $E_2$ processed through said receiver means having relative amplitudes and said digital comparator means forms a binary output given by $1$ if $|E_2| \leq X|E_1|$
and
$0$ if $|E_2| > X|E_1|$
where
$E_1$ = first antenna signal;
$E_2$ = second antenna signal;
$X$ = scale factor 6. The circuit of claim 2 wherein said antenna means forms two signals $E_1$ and $E_2$ processed through said receiver means having relative phases and said digital comparator means forms a binary output given by
 1   if $E_1$ and $E_2$ are in phase
 0   if $E_1$ and $E_2$ are not in phase where in phase is within ± 89°.

7. The circuit of claim 6 wherein said antenna means forms signals processed through said receiver means having relative amplitudes and said digital comparator means forms a binary output given by
$1$ if $|E_2| \leq X|E_1|$
and
$0$ if $|E_2| > X|E_1|$
where
$E_1$ = first antenna signal;
$E_2$ = second antenna signal;
$X$ = scale factor.

8. The apparatus of claim 1 wherein said receiver means includes at least two simultaneously operative channels which are matched in gain and phase shift to a specified level.

9. The apparatus of claim 8 wherein a 90° phase shifter means is incorporated in one of the two channels.

10. The apparatus of claim 9 including means for controlling operation of said phase shifter means to times when said two channels receive signals from said antenna means which are a function of $\phi$ and $2\phi$.

11. The apparatus of claim 1 wherein said comparator means includes a binary phase detector.

12. The apparatus of claim 1 wherein said comparator means includes a pair of envelope detector means which are connected to at least one ratio detector means.

13. The apparatus of claim 12 wherein said ratio means are connected to a memory means for temporary storage prior to being supplied to the last named means of claim 1.

14. The apparatus of claim 13 wherein the last named means of claim 1 includes a decoding logic network which indicates sector location where each sector is represented by unique Boolean algebraic expressions.

15. The invention of claim 1 wherein said last named means includes a decoding logic network which responds to binary input signals.

16. The apparatus of claim 15 wherein said logic network implements a unique Boolean algebraic expression for each sector.

17. The apparatus of claim 16 wherein at least two sectors are represented by alternative Boolean algebraic expressions, at least one of which is operative when the antenna pattern of said antenna means is distorted from the ideal such that nulls of the patterns are mislocated at least to an adjacent sector.

18. The apparatus of claim 17 wherein said logic network implements two expressions which are or-ed.

19. The apparatus of claim 17 wherein said sectors represented by alternative expressions are alternately arranged in a circle about said antenna means.

20. The apparatus of claim 13 wherein said memory means is strobed periodically to deliver stored data indicative of comparisons to the last named means of claim 1.

* * * * *